United States Patent
Bennett

(10) Patent No.: US 7,370,215 B2
(45) Date of Patent: May 6, 2008

(54) METHOD AND APPARATUS OF SELF-POWERING DOWN ATA DEVICES

(75) Inventor: Joseph Bennett, Roseville, CA (US)

(73) Assignee: Intel Corporation, Santa Clara, CA (US)

(*) Notice: Subject to any disclaimer, the term of this patent is extended or adjusted under 35 U.S.C. 154(b) by 360 days.

(21) Appl. No.: 11/168,084

(22) Filed: Jun. 27, 2005

(65) Prior Publication Data
US 2006/0294403 A1 Dec. 28, 2006

(51) Int. Cl.
G06F 1/00 (2006.01)
(52) U.S. Cl. ........................ 713/300; 713/323
(58) Field of Classification Search ........... 713/300, 713/323
See application file for complete search history.

(56) References Cited

U.S. PATENT DOCUMENTS 5,404,546 A * 4/1995 Stewart ............... 713/322
5,504,907 A * 4/1996 Stewart et al. ........ 713/324
5,799,198 A * 8/1998 Fung .................... 713/323
5,819,100 A * 10/1998 Pearce .................. 713/323
6,038,671 A * 3/2000 Tran et al. ............. 713/300

OTHER PUBLICATIONS

"ATAH: ATA Host Controller", Semiconductor Design Solutions, SIDSA, ATAH Datasheet, document version v0.1, 2 pages.
"How It Works: ATA FAQ", Hale's HIW: ATAFAQ, http://www.ata-atapi.com/hiwfaq.htm, May 30, 2005, 16 pages.
"IOCTL_ATA_PASS_THROUGH", Storage Devices: Windows DDK, dated Jun. 3, 2005, 2 pages.
"ATA Interface Reference Manual", Seagate, publication No. 36111-001, Rev. C, dated May 21, 1993, pp. 1-70.

* cited by examiner

Primary Examiner—Thomas Lee
Assistant Examiner—Michael Wang
(74) Attorney, Agent, or Firm—Schwabe, Williamson & Wyatt, P.C.

(57) ABSTRACT

A system includes a host that may be used to interface with an advanced technology attachment (ATA) device. The host includes at least one timer used to determine when to place the ATA device in a low power mode independently of an operating system (OS).

18 Claims, 4 Drawing Sheets

METHOD AND APPARATUS OF SELF-POWERING DOWN ATA DEVICES

FIELD OF INVENTION

The present invention relates generally to the field of power management; and, more specifically, to a technique for reducing power consumption of ATA (advanced technology attachment) devices.

BACKGROUND

Computer systems are becoming increasingly pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, workstations, and servers. Computer systems typically include one or more processors. A processor may manipulate and control the flow of data in a computer. To provide more powerful computer systems for consumers, processor designers strive to continually increase the operating speed of the processor. As processor speed increases, the power consumed by the processor tends to increase as well.

One approach to reducing overall power consumption of a computer system is to change the focus of power reduction from the processor to other devices that have a significant impact on power. These other devices may include, for example, a display, an input/output (I/O) device, a memory, etc. Typically, to reduce the power consumption of these devices, the operating system (OS) may be configured to detect the happenings or absence of certain events before reducing the power consumption of the devices. For example, the OS may indicate to a device driver that it is time to place a device into a standby state or any other low power states. The device driver may then issue commands to put the device into a low power state. This approach may not be efficient because it may take sometimes before an idle device receives the commands from the device driver. Techniques are being developed to make this process more efficient.

BRIEF DESCRIPTION OF THE DRAWINGS

The present invention is illustrated by way of example and not limitation in the accompanying figures in which like references indicate similar elements and in which.

DETAILED DESCRIPTION

In some embodiments, a computer system may include a device that may be powered down to reduce the power consumption of the computer system. The device may be an ATA (advanced technology attachment) device. Hardware timers may be used to determine when power consumption of an idle ATA device is to be reduced.

In the following description, for purposes of explanation, numerous specific details are set forth to provide a thorough understanding of the present invention. It will be evident, however, to one skilled in the art that the present invention may be practiced without these specific details. In other instances, well known structures, processes, and devices are shown in block diagram form or are referred to in a summary manner in order to provide an explanation without undue detail.

Figure 1:
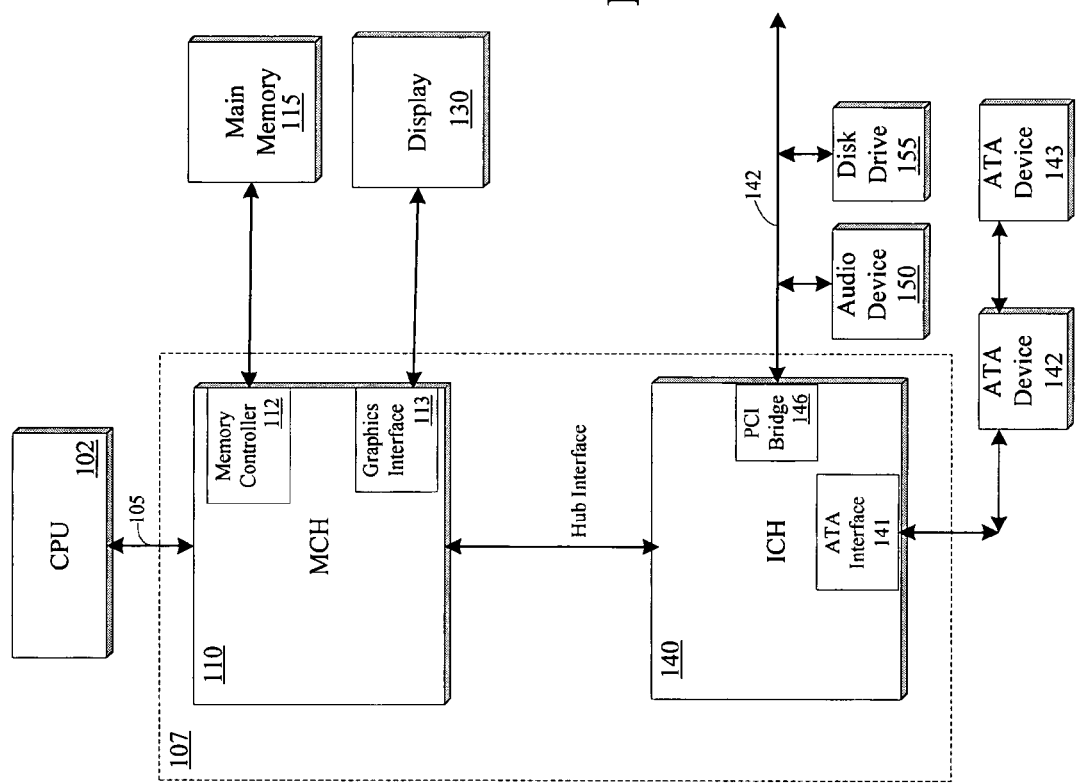
FIG. 1 is a block diagram illustrating an example of a computer system that may be used, in accordance with an embodiment.

FIG. 1 is a block diagram illustrating an example of a computer system that may be used, in accordance with an embodiment. Computer system 100 may include a central processing unit (CPU) 102 and may receive its power from an electrical outlet or a battery (not shown). The CPU 102 and chipset 107 may be coupled to bus 105. The chipset 107 may include a memory control hub (MCH) 110. The MCH 110 may include a memory controller 112 that is coupled to memory 115. The memory 115 may store data and sequences of instructions that are executed by the CPU 102 or any other processing devices included in the computer system 100. The MCH 110 may include a graphics interface 113. Display 130 may be coupled to the graphics interface 113. The chipset 107 may also include an input/output control hub (ICH) 140. The ICH 140 is coupled with the MCH 110 via a hub interface. The ICH 140 may provide an interface to input/output (I/O) devices within the computer system 100. The ICH 140 may include PCI bridge 146 that provides an interface to PCI bus 142. The PCI bridge 146 may provide a data path between the CPU 102 and peripheral devices. An audio device 150, an image capturing device 152, and a disk drive 155 may be connected to the PCI bus 142. The disk drive 155 may include a storage media to store data and sequences of instructions that are executed by the CPU 102 or any other processing devices included in the computer system 100.

The ICH 140 may also include an integrated ATA interface 141 (e.g., via an ATA connector). ATA devices 142, 143 may be coupled to the ATA interface 141. The ICH 140 (or the chipset 107) may be referred to as a host which may use the ATA interface 141 to issue commands to the ATA device 142 via a command register. The ATA device 142 may include a controller logic or controller (not shown) which processes the commands. The controller may include an internal clock and may interpret and execute the commands written in the command register. Upon completion of the command, status information is written into a status register and may be accessed by the host. Examples of commands that may be issued by the host include power management commands to place the ATA device 142 in various power modes. The ATA device 142 may also respond to commands inquiring about its current power mode. The ATA device 142 may be, for example, a disk storage device.

Figure 2:
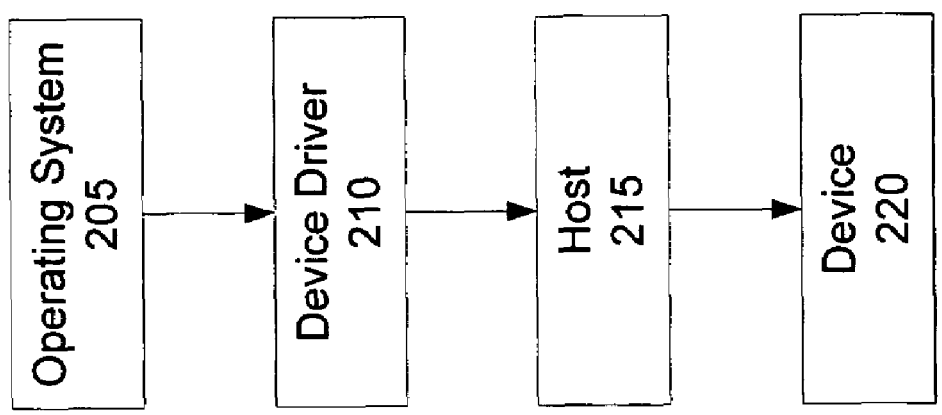
FIG. 2 is a block diagram illustrating an example of how AT commands are issued and processed, in accordance with one embodiment.

FIG. 2 is a block diagram illustrating an example of how AT commands are issued and processed, in accordance with one embodiment. Typically, the commands are initiated by an operating system (OS) 205. The commands are then sent to a device driver 210. For example, after the OS 205 recognizes that there is no activity, the OS 205 may send commands to the device driver 210 to place the ATA device 142 into a low power mode. For example, the Microsoft Windows XP OS (from Microsoft Corporation of Redmond, Wash.) includes a power savings scheme that enables a user to configure the OS turning off a hard disk after a certain time period. Typically, this is performed when the computer system is running on batteries to save battery power. For the Windows XP OS, the time period starts from a minimum of three (3) minutes to indefinite (when the "never" option is selected). The device driver 210 may then communicate the OS commands to the host 215. The host 215 may then issue power management commands to the ATA device 220 by using the command register.

The power management commands may switch the ATA device 220 to an active mode, an idle mode, a standby mode or a sleep mode. The ATA device 220 may be in the active mode when it is performing tasks (e.g., seek, read, write, etc.). When the ATA device 220 is inactive for a certain length of time (e.g., five seconds), it may be switched from the active mode to the idle mode. An idle timer may be used. In the idle mode, the heads may be parked. However, most or all of the other components in the ATA device 220 may remain enabled (e.g., device spindle remain at same speed as in the active mode, etc.) and consume power as when the ATA device 220 is in the active mode. The host 215 may monitor the interface or the status register to determine when the ATA device enters the idle mode.

Any one of the standby and sleep modes may be viewed as a low power mode. For example, the host 215 may issue a "Standby Immediate" command to place the ATA device 220 in the standby mode. When the ATA device 220 is switched to the standby mode from the active mode or the idle mode, the device spindle may spin down instead of remaining at the same speed. In the standby mode, the ATA device 200 may consume less power than when being in the active mode or in the idle mode. The host 215 may issue a "Sleep Immediate" command to place the ATA device 220 in the sleep mode. In the sleep mode, the ATA device 220 may still receive commands but may consume less power than the standby mode. In the Window XP environment, the ATA device 220 may remain in the idle mode for a long time (e.g., at least three minutes) before the host 215 issues commands to place it in one of the low power modes. This may be because it is faster to switch from the idle mode to the active mode, and any time within the three minutes, the OS 205 may issue commands to access the disk, for example. However, if the ATA device 220 remains idle for the entire three minutes, lots of power savings potential may be lost, and the battery life may be affected.

Figure 3B:
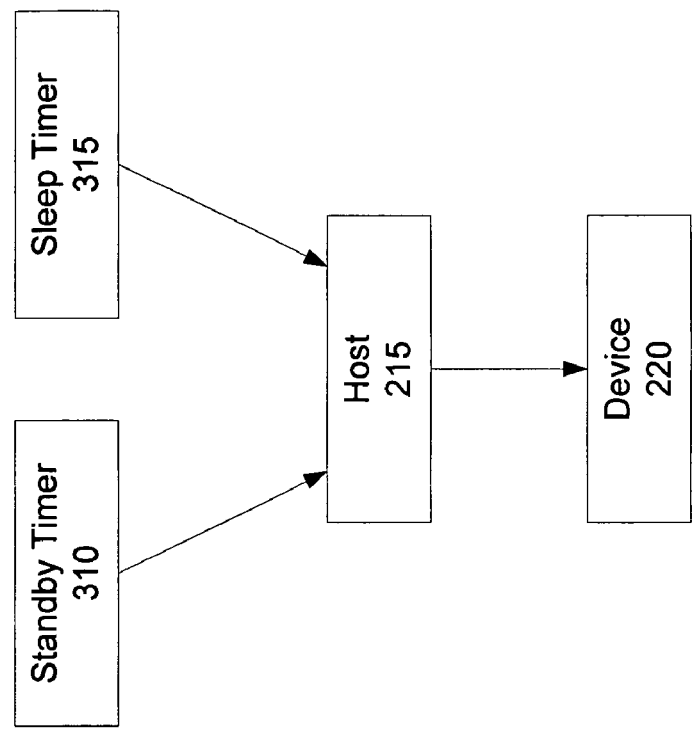
FIG. 3B is a block diagram illustrating an example of using two timers to place an ATA device into a low power mode, in accordance with one embodiment.
Figure 3A:
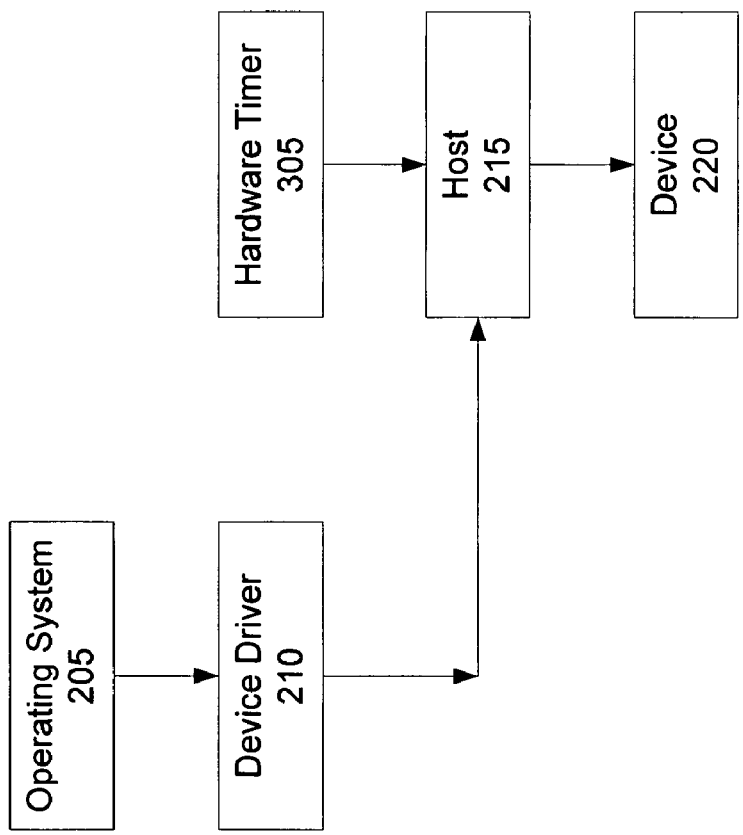
FIG. 3A is a block diagram illustrating an example of using a timer to place an ATA device into a low power mode, in accordance with one embodiment.

FIG. 3A is a block diagram illustrating an example of using a timer to place an ATA device into a low power mode, in accordance with one embodiment. FIG. 3A is somewhat similar to FIG. 2 except that a timer 305 is used to determine when to place the ATA device 220 into a low power mode. The timer 305 may be a hardware timer. It may also be a software timer. For one embodiment, the timer 305 may expire in a time period that is less than the minimum time period set by the OS 205. As mentioned in the example above, the time period used by the OS 205 is minimum three minutes. The timer 305 may operate in milliseconds to tens of milliseconds range. The timer 305 may be used to determine the length of time that the ATA device 220 is in the idle mode. For example, the timer 305 may be a count down or count up timer and may be set to a value such that upon its expiration, a time period equivalence of 20 seconds has elapsed. A signal or an interrupt may be generated when the timer 305 expires. For one embodiment, the timer 305 may be implemented in the host 215.

For one embodiment, upon expiration of the timer 305, commands may be written into the command register to cause the ATA device 220 to be placed in the standby mode. Alternatively, commands may be used to place the ATA device 220 into the sleep mode. For one embodiment, after the timer 305 reaches a first threshold (where the ATA device 220 is placed in the standby mode), it may continue (e.g., counting up) until a second threshold is reached. Reaching the second threshold may cause the ATA device 220 to be placed in the sleep mode. The timer 305 may then be reset and restarted when ATA device 220 exits these low power modes and return to the idle mode or the active mode. It may be noted that by having the host 215 independently switches the ATA device 220 into the standby mode and the sleep mode from the idle mode, the OS 205 may still thinks that the ATA device 220 is in the idle mode. This may be advantageous because the sooner the ATA device 220 is placed in the standby or sleep mode, the less power is consumed by the ATA device 220.

FIG. 3B is a block diagram illustrating an example of using two timers to place an ATA device into a low power mode, in accordance with one embodiment. For one embodiment, there may be a first timer 310 (referred to herein as a standby timer) used to determine when to place the ATA device into the standby mode. There may also be a second timer 315 (referred to herein as a sleep timer) used to determine when to place the ATA device into the sleep mode. Both the standby timer 310 and the sleep timer 315 may be hardware timers and may be implemented in the host 215. The timers 310, 315 may be set to values such that when they expire (either by counting down or counting up) appropriate commands are written into the command register.

For one embodiment, when the standby timer 310 expires, the ATA device 220 may be placed in the standby mode. This may be performed by writing the "Standby Immediate" command into the command register. For another embodiment, when the sleep timer 315 expires, the ATA device 220 may be placed in the sleep mode. This may be performed by writing the "Sleep Immediate" command into the command register. When the ATA device 220 exits the standby mode or sleep mode, the standby timer 310 and the sleep timer 315 may be reset and may subsequently be restarted. For one embodiment, when the ATA device 220 is placed in the standby mode or in the sleep mode, the controller may turn off its internal clock. As mentioned above, it may be possible that the sleep timer expires even before the OS 205 sends the standby command to the host 215.

It may be noted that, in addition to working with the standby timer 310 and the sleep timer 315, the host 215 may continue to receive commands from the OS 205 via the device driver 210. It is possible that the power mode of the ATA device 220 according to the OS 205 may not be the same as the power mode that the ATA device 220 is actually in. For example, according to the OS 205, the ATA device 220 is in the idle mode when the ATA device 220 may actually be in the standby or sleep mode. When the ATA device 220 is in the standby mode and a non-power management command is received from the OS 205, the ATA device 220 may be switched to the active mode to execute the command. When the ATA device 220 is in the sleep mode, and a non-power management command is received from the OS 205, a "Soft Reset" command may be executed by the controller to first take the ATA device 220 out of the sleep mode and into the standby mode or active mode. This wake up process may take time (e.g., a few seconds) but may still be a short period of time comparing to the time the OS 205 waits before placing the ATA device 220 into the standby mode. The command from the OS 205 may then be executed by the controller as if the ATA device 220 has been in the idle mode or the active mode the entire time.

Figure 4:
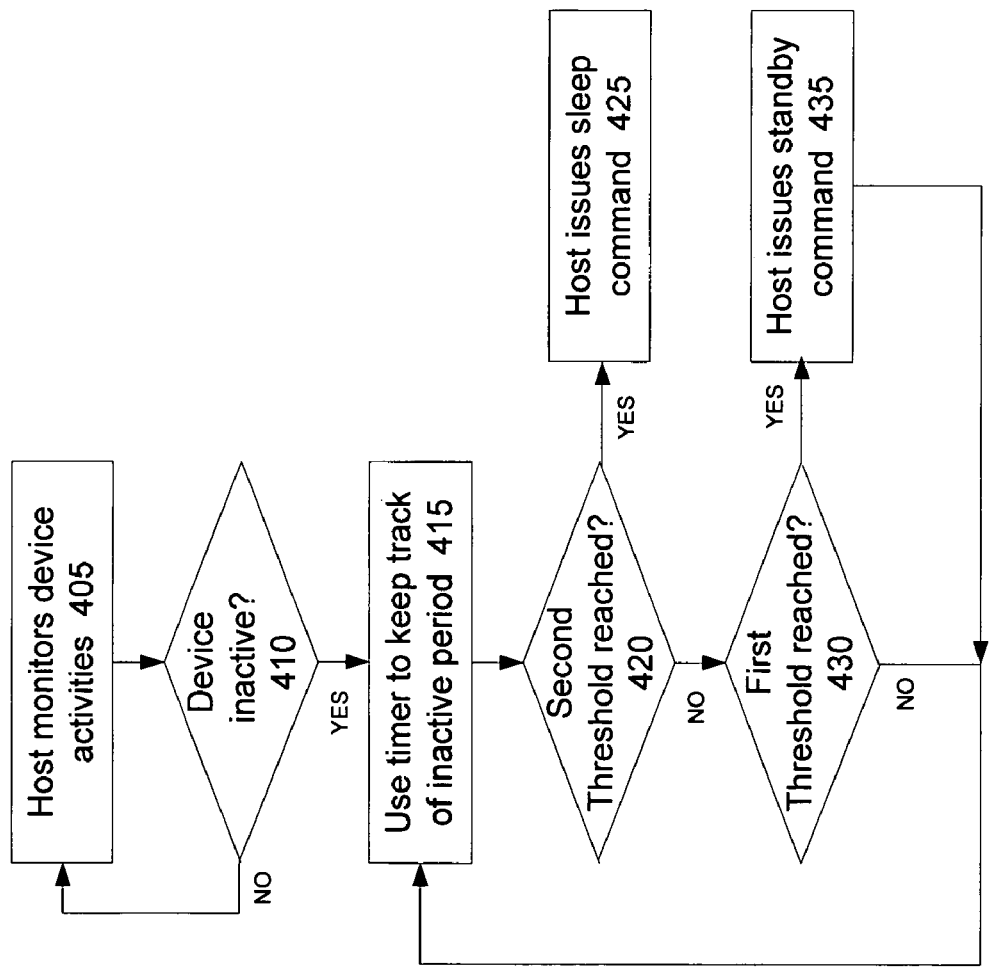
FIG. 4 is a block diagram illustrating an example of a process used to place an ATA device into a low power mode, in accordance with one embodiment.

FIG. 4 is a block diagram illustrating an example of a process used to place an ATA device into a low power mode, in accordance with one embodiment. In this example, one timer is used to determine the period of inactivity of the ATA device. The process starts at block 405 where the host may monitor the ATA device to send it commands or to read its status. At block 410, a test is made to determine if the ATA device is inactive. If it is active, the process continues at block 405. If it is inactive, the process flows to block 415 where a timer is started to keep track of the inactive period. There may be two thresholds; a first threshold is used to determine when to place the ATA device into the standby mode; a second and longer threshold is used to determine when to place the ATA device into the sleep mode.

At block 420, a test is performed using the timer to determine if the period of inactivity reaches a second threshold. If the period of inactivity reaches the second threshold, the ATA device may be placed into the sleep mode, as shown in block 425. From block 420, if the second threshold has not been reached, the process flows to block 430 where a test is performed to determine if the first threshold has been reached. If it has been reached, the process flows to block 435 where the ATA device is placed in the standby mode. The process then flows to block 415 to continue monitoring the period of inactivity. From block 430, if the first threshold has not been reached, the process continues to block 415. It may be noted that, although the above examples refer to ATA devices, the techniques described may also be applied to other devices to independently lowering the power consumption of the devices rather than relying entirely on similar commands from an OS.

In some embodiments, it is to be understood that they may be implemented as one or more software programs stored within a machine readable medium. A machine readable medium includes any mechanism for storing or transmitting information in a form readable by a machine (e.g., a computer). For example, a machine readable medium includes read only memory (ROM), random access memory (RAM), magnetic disk storage media, optical storage media, flash memory devices, electrical, optical, acoustical or other form of propagated signals (e.g., carrier waves, infrared signals, digital signals, etc.), etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
   using a first timer to determine when to place an advanced technology attachment (ATA) device into a standby mode;
   placing the ATA device into the standby mode when the first timer reaches a first threshold, the standby mode including an idle mode according to an operating system (OS);
   using a second timer to determine when to place the ATA device into a sleep mode; and
   placing the ATA device into the standby mode when the second timer reaches a second threshold, the second threshold being more than the first threshold, wherein the first timer and the second timer are implemented in a host coupled to the ATA device, and wherein the first timer and the second timer are used independently of any instructions from the OS.

2. The method of claim 1, wherein the first timer reaches the first threshold faster than a time it takes for the ATA device to receive a command originated from the OS to place it in the standby mode from the idle mode.

3. The method of claim 1, further comprising turning off an internal clock of the ATA device when the ATA device is placed into the standby mode or the sleep mode.

4. A system, comprising:
   a processor; and
   a chipset coupled to the processor, the chipset including a host to interface with an advanced technology attachment (ATA) device coupled to the host, wherein the host is to issue low power commands to the ATA device when the ATA device is in an idle mode for a first predetermined length of time, the low power commands including commands to place the ATA device into a standby mode or a sleep mode, the standby mode or the sleep mode including the idle mode according to an operating system (OS). wherein the low power commands are issued independently of the OS executing in the system.

5. The system of claim 4, wherein the host is to issue the low power commands to the ATA device sooner than the host would have received similar commands from the OS.

6. The system of claim 5, wherein a timer is used by the host to determine when the first predetermined length of time has elapsed to place the ATA device into the standby mode.

7. The system of claim 6, wherein the timer is used by the host to determine when a second predetermined length of time has elapsed to place the ATA device into the sleep mode from the standby mode, the second predetermined length of time being longer than the first predetermined length of time.

8. The system of claim 7, wherein the timer is a hardware timer implemented in the host, and wherein the timer is reset after the ATA device is switched from the standby mode or from the sleep mode to an active mode.

9. The system of claim 8, wherein the timer is restarted when the ATA device enters the idle mode.

10. An apparatus, comprising:
    a host to interlace with an ATA (advanced technology attachment) device, the host including a first timer to be used in determining when to independently issue a command to place the ATA device into a standby mode, the standby mode including an idle mode according to an operating system (OS), wherein the first timer is configured to expire before the host is to receive a command from the OS to place the ATA device into the standby mode.

11. The apparatus of claim 10, wherein the host further includes a second timer to be used in determining when to independently issue a command to place the ATA device into a sleep mode, and wherein the second timer is configured to expire after the first timer and before the host is to receive a command from the OS to place the ATA device into the sleep mode.

12. The apparatus of claim 11, wherein the host is to issue a reset command to the ATA device when the host receives a non-power management command from the OS for the ATA device.

13. A method, comprising:
  issuing a standby command to place a device into a standby mode when the device has been in an idle mode for a first period of time, the standby mode including the idle mode according to an operating system (OS); and
  issuing a sleep command to place the device into a sleep mode when the device has been in a standby mode for a second period of time, wherein the standby command and the sleep command are to be issued by a host based on expiration of a first timer and of a second timer, respectively.

14. The method of claim 13, wherein the first timer is configured to expire before the host is to receive the standby command originated by an operating system (OS).

15. The method of claim 14, wherein the second timer is configured to expire after the first timer and before the host is to receive the standby command originated by an operating system (OS).

16. The method of claim 15, wherein when the host receives a non-power management command from the OS and the device is in the sleep mode caused by the expiration of the second timer, the host is to issue a reset command prior to issuing the non-power management command from the OS.

17. The method of claim 16, wherein the device is to turn off its internal clock when the device is placed in the sleep mode.

18. The method of claim 17, wherein the device is an advanced technology attachment (ATA) device.

* * * * *

UNITED STATES PATENT AND TRADEMARK OFFICE
CERTIFICATE OF CORRECTION

PATENT NO. : 7,370,215 B2  Page 1 of 1
APPLICATION NO. : 11/168084
DATED : May 6, 2008
INVENTOR(S) : Joseph Bennett It is certified that error appears in the above-identified patent and that said Letters Patent is hereby corrected as shown below:

Column 5
Line 63, "...system (OS):..." should read --..system (OS);...--.

Column 5
Line 66, "...the standby mode..." should read --...the sleep mode...--.

Column 6
Line 25, "...system (OS). wherein..." should read --...system (OS), wherein...--.

Signed and Sealed this

Twenty-sixth Day of May, 2009

JOHN DOLL
*Acting Director of the United States Patent and Trademark Office*